NORMAN F. BOUNSALL
INVENTOR.

BY Robert H. Clay

ATTORNEY

Jan. 18, 1966 N. F. BOUNSALL 3,230,307

INTERLOCK SYSTEM FOR WIDEBAND MAGNETIC RECORDING AND REPRODUCING SYSTEMS

Filed Sept. 4, 1962 3 Sheets-Sheet 2

NORMAN F. BOUNSALL
INVENTOR.

BY Robert G. Clay

ATTORNEY

NORMAN F. BOUNSALL
INVENTOR.

BY Robert G. Clay

ATTORNEY

United States Patent Office 3,230,307

Patented Jan. 18, 1966

3,230,307

INTERLOCK SYSTEM FOR WIDEBAND MAGNETIC RECORDING AND REPRODUCING SYSTEMS

Norman F. Bounsall, Palo Alto, Calif., assignor to Ampex Corporation, Redwood City, Calif., a corporation of California Filed Sept. 4, 1962, Ser. No. 220,983
13 Claims. (Cl. 178—6.6)

This invention relates to magnetic tape systems, and particularly to systems for selectively and synchronously reproducing television and other program material from different sources.

Much television program and other broadcast material is recorded on film or tape, the movement of which is positively controlled by conventional sprocket drives. Thus these recording members and systems are suitable for the use of techniques developed in the motion picture industry for interlocking two or more different recording and reproducing mechanisms so that different recordings may be selectively combined. Conventionally, each positive advance mechanism is so intercoupled to the others during startup intervals that equivalent lengths of recording medium are used in reaching normal speeds. Thereafter the recording members are run together in what may be called "double system" operation. Usually, two or more tapes or films are started together at selected synchronizing points and then run together through a selected program segment. This enables program editors to mix, substitute, dub or superimpose material from different sources, and affords great versatility in creating special effects and improving program presentations.

An interlock or double system capability is very desirable for wideband data systems, which utilize magnetic tape without sprocket holes for the storage and playback of program material, but such a capability has not heretofore been available in the art. The most widely used system of this type employs a relatively wide magnetic tape which is partially cupped around a rotating magnetic head drum on which magnetic heads are peripherally mounted. An adequate relative head-to-tape speed is achieved by rotating the head drum at a high rate while moving the tape longitudinally so that the heads record transverse tracks across the tape. During playback, the signals from the separate heads are switched together so that the recorded signal is reproduced as originally presented. The system has been found superior to other systems for the provision of high quality, time stable signals, and is the principal type of system used for television broadcast work.

Such television tape recorders, however, use a continuous (as compared with a sprocketed or positive) drive system for advancing the tape and require relatively long intervals (up to several seconds or more) to reach full speed. The acceleration time and the introduction of tape slippage greatly complicate the interlock problem. It is possible, for example, to prepare an additional track of video or audio in synchronism with the reproduction of a previous recording. In order for the two record tracks to be combined, however, the two tapes must again be played with the program material synchronized. Even though proper starting points may be located, the acceleration times and slippages will vary so that the reproduced materials are not in synchronism when normal speed is reached. The same effect arises when one or more positively driven recorders is to be operated with a continuous drive system. For the photographic and audio parts of motion picture films, start points are identified by a suitable dual indicating device, such as a clapper board mechanism. Closing of the clapper provides both visual and audio indications of a selected point in time. The same time point may then be located on different media by direct visual inspection of film frames and by use of a magnetizable fluid on magnetic tape to locate the unique signal excursion visually.

It is therefore evident that complete flexibility in synchronizing, assembling, dubbing and editing program material with a continuously driven type of recorder requires that there be means to interlock separate recorders, as well as means to interlock one or more recorders with film mechanisms or separate incrementally driven mechanisms.

It is therefore an object of the present invention to provide an improved interlock system for the preparation of television program material.

A further object of the present invention is to provide an improved system for operating different recorder mechanisms so as to provide dubbing and mixing capabilities.

Another object of the present invention is to provide an improved interlock system that is capable of operating a continuous drive magnetic tape recorder in a predetermined time base relationship to other recording devices.

Yet another object of the invention is to provide double system capability for television recorders.

Systems in accordance with the present invention interlock a continuous drive magnetic tape recorder with other recorder devices by sensing differences between the actual movement of the magnetic tape and the other devices, and adjusting the rates of advance during acceleration. In a general example of such a system, as used in television recording, an interlock drive is mechanically coupled to control a pulse generator which has a selected repetition rate at normal reproducing speeds. The magnetic tape also is arranged so as to have recorded pulse patterns which provide a like pulse repetition rate at normal operating speeds. During operation from a standing start, the two pulse sequences are compared, and any differences are used to control the acceleration rate of the magnetic tape so as to maintain the recorded material on the tape in proper time relation to the recorded material which is driven under control of the interlock system.

In one specific example of a system in accordance with the invention, the capstan of a television tape recording system is driven under electronic control. A transverse track wideband recording system which includes a separate control track produces edit pulses from the control track at a rate of 30 per second in normal speed operation. The interlock system for the various other recording and reproducing mechanisms is coupled mechanically to drive the pulse generator comprising a magnetic disc having spaced incremental recordings from which pulses are generated at a normal speed rate of thirty pulses per second. Once the magnetic tape is positioned at the proper start point, the system may be started. Thereafter the reproduced edit pulses and the reproduced pulses from the disc are counted, and the counts are compared. The two pulse trains are counted and stored in binary registers, and the differences between the contents of the registers are sensed by a differential comparator which generates an error voltage representative of amplitude and polarity. The error voltage is applied to control the frequency of the A.C. signal generated by a voltage controlled oscillator which governs the speed of operation of the drive system for the capstan. When normal speed is attained with the reproduced program material in synchronism, the system may return the magnetic tape recorder to normal operation.

In another specific example of a system in accordance with the invention, the timing signals generated by movement of the interlock mechanism and the edit pulses on the magnetic tape are read by stationary scanning means and the tape speed is mechanically controlled. The reproduced timing and edit pulses are coupled to a phase comparator, the output signal from which controls the operation of a D.C. motor. The motor in turn operates one input of a differential drive mechanism in the coupling between the tape capstan and the capstan drive. The differential mechanism also couples the capstan shaft to the interlock motor, and is engaged thereto during the run up interval. Any errors caused by capstan slippage or other factors are corrected by speed variations of the D.C. motor. Upon reaching normal speed, the interlock motor is disconnected and normal synchronous operation of the tape system is obtained.

A better understanding of the invention may be had by reference to the following description, taken in conjunction with the accompanying drawings, in which.

Figures 1, 4:
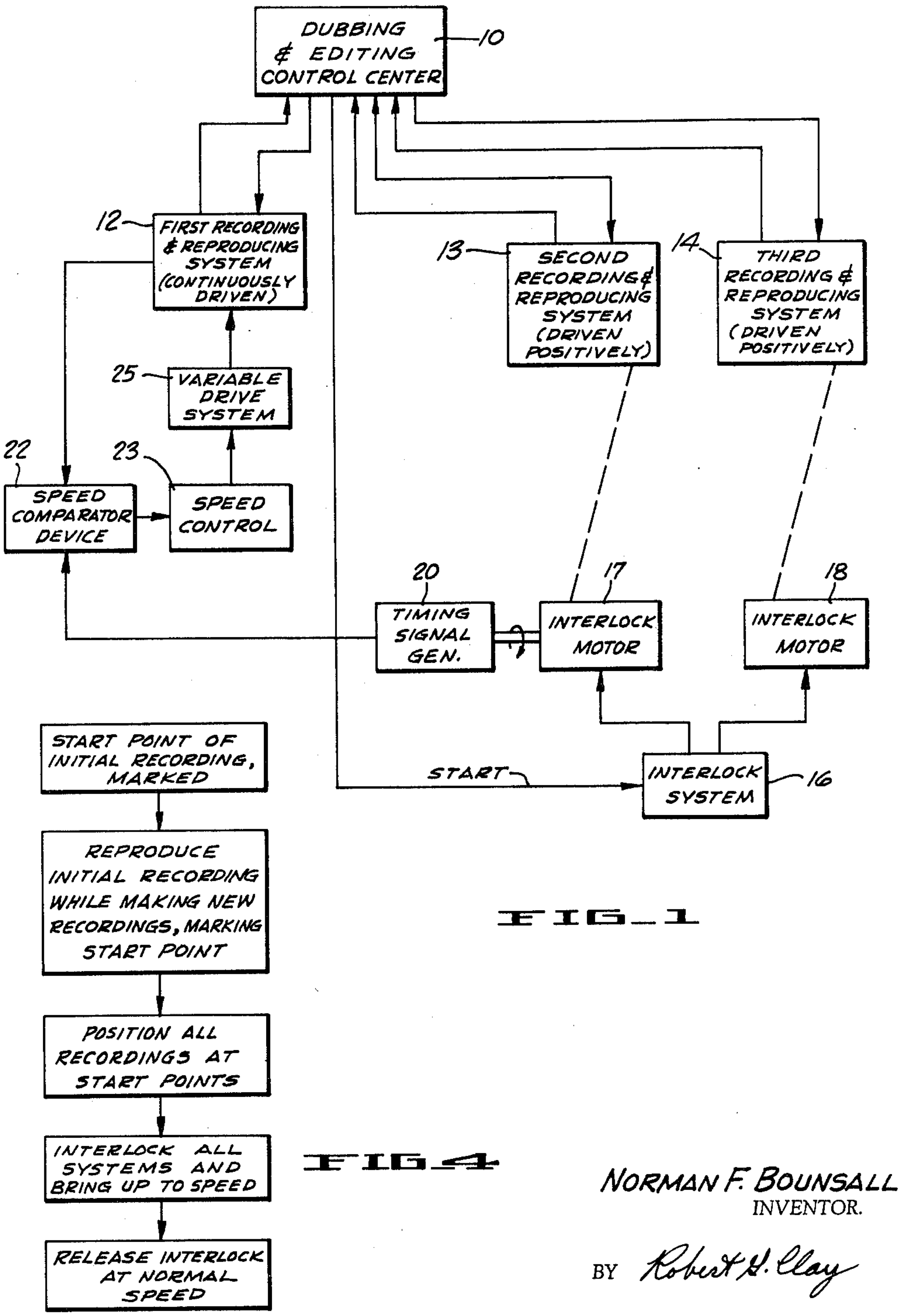
FIGURE 1 is a block diagram representation of a control system for providing double system operation of continuously driven recording and reproducing systems.
Figure 3:
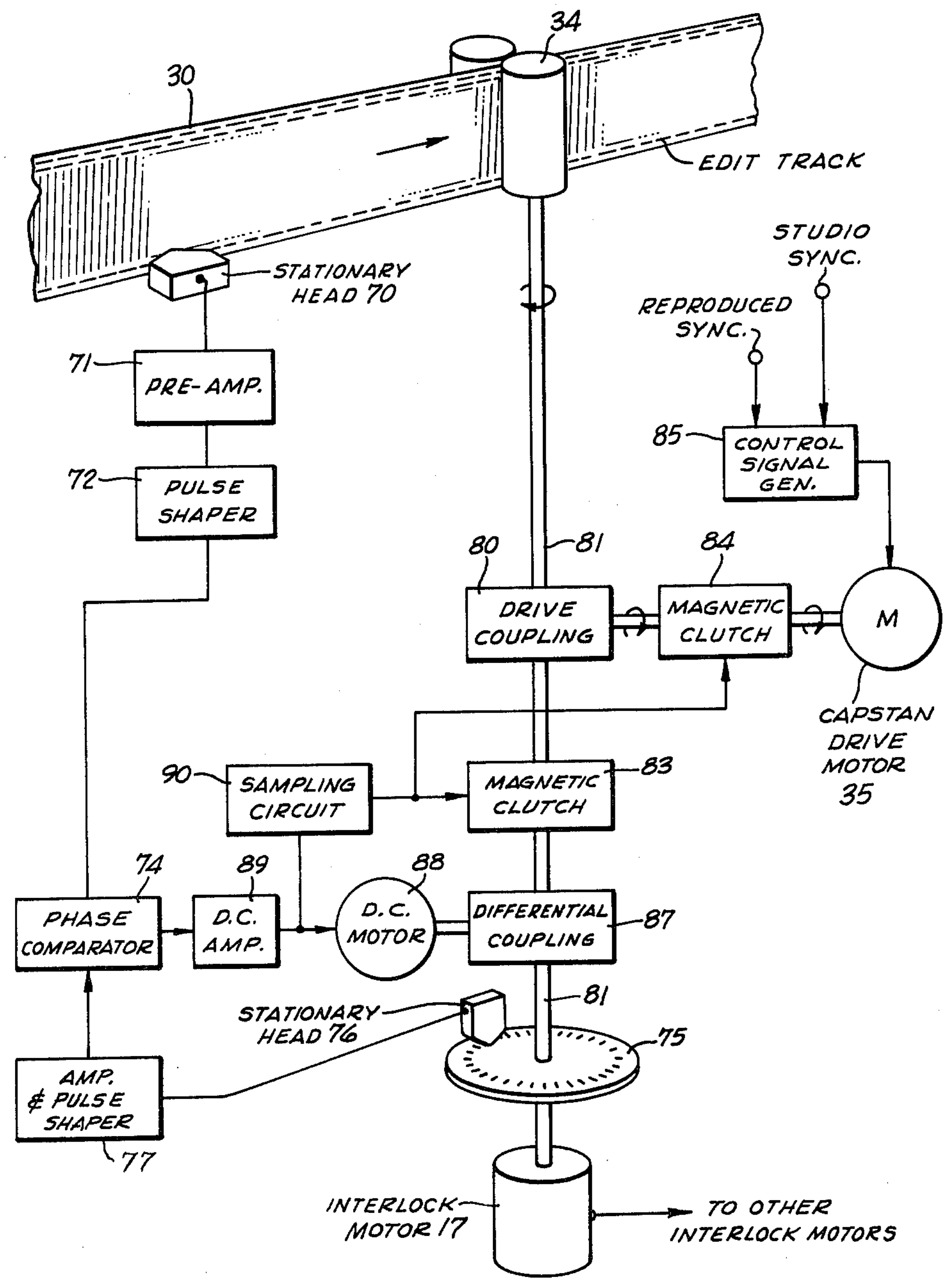

FIGURE 3 is a combined partial perspective and block diagram representation of a interlock control system in accordance with the invention which utilizes electromechanical control means; and FIGURE 4 is a block diagram representation of successive steps which may be employed in a method for interlocking one or more continuous recorders with other recorder mechanisms to effect synchronous recording, dubbing, and special effects.

The block diagram representation of FIGURE 1 simplifies the elements and relationships existing in a typical interlock system as it is conventionally employed in the television production and the motion picture industries. A dubbing and editing control center 10 is here represented as the means for selecting synchronizing, mixing and special effects with a number of different recording and reproducing systems 12, 13 and 14 respectively. Although a great many different recording and reproducing systems may be interlocked in particular applications, the example of three different systems 12, 13 and 14 will suffice to illustrate the general principles of the invention. As shown, the first recording and reproducing system 12 is of the continuously driven type, in that the tape, film or other storage member is not positively and incrementally driven. The second and third recording and reproducing systems 13, 14 are here assumed to be incrementally and positively driven. The term "double system operation" should be considered to include all combinations of two or more systems ,whether continuously or incrementally driven.

In operation from selected start points on the record mediums used for each of the recording and reproducing systems 12, 13 and 14, control is maintained by an interlock system 16 which includes separate intercoupled interlock motors 17, 18 coupled to the second and third recording and reproducing systems 13, 14 respectively. The continuously driven recording and reproducing system 12, however, cooperates with a variable speed drive which is responsive to the relationship of signals from both the first recording and reproducing system 12 and the interlock system 16. This control system includes a timing signal generator 20 which is mechanically driven by or from a part of the interlock system, here shown as a shaft from one of the interlock motors 17. The timing signal generator 20 provides pulses at a selected repetition rate during normal speed operation. The recording and reproducing system 12 is also adapted to concurrently provide pulses at the selected repetition rate when operating at normal speed. Both pulse trains are applied to a speed comparator device 22, from which is generated an electrical signal or mechanical drive for a speed control device 23 of variable drive system 25 for the first recording and reproducing system 12.

Very briefly stated, the elements of this system cooperate so that the variable drive system 25 adjusts the rate of the continuously driven first recording and reproducing system 12 during acceleration times to maintain synchronism with the positively driven recording and reproducing systems 13 and 14 as they also accelerate. An interlock sequence is begun by first locating the prerecorded visual or audible start point indications on the record members at selected positions in the associated system (e.g. under a read head in a magnetic tape system). With magnetic tape recordings a magnetic fluid is wiped along the longitudinal track containing the start point record to "develop" the same and which may then be visually distinguished.

With all of the record members in the systems 12, 13 and 14 positioned at the desired start points, a start signal is given to the interlock system 16. Thereafter, pulses from the timing signal generator 20 indicative of the extent of movement of the interlock system 16 are compared to the pulses from the first recording and reproducing system 12 which indicate the extent of movement of the continuously driven record member. This is referred to as a speed comparison for simplicity even though the relative speeds between the different mechanisms may vary and the systems are actually accelerating during the startup interval. The output of the speed comparator device 22 operates the variable drive system 25 through the speed control 23 so as to maintain the various reproductions from the systems 12, 13, 14 in proper time relationship. When the systems reach normal operating speeds, control of the first recording and reproducing system 12 may be relinquished to a time stable source, if desired. In any event, the picture, sound, and other presentations from the different systems 12, 13 and 14 are maintained in synchronism thereafter. The sequence can be repeated as many times as desired. Thus, the dubbing and editing control center 10 may be used to check the combined effect of the reproductions from the different systems 12, 13 and 14, to dub a reproduced signal from one of the systems onto a signal previously recorded on the other systems, and to combine, insert, and assemble reproduced program material interchangeably between the various systems 12, 13 and 14.

Figure 2:
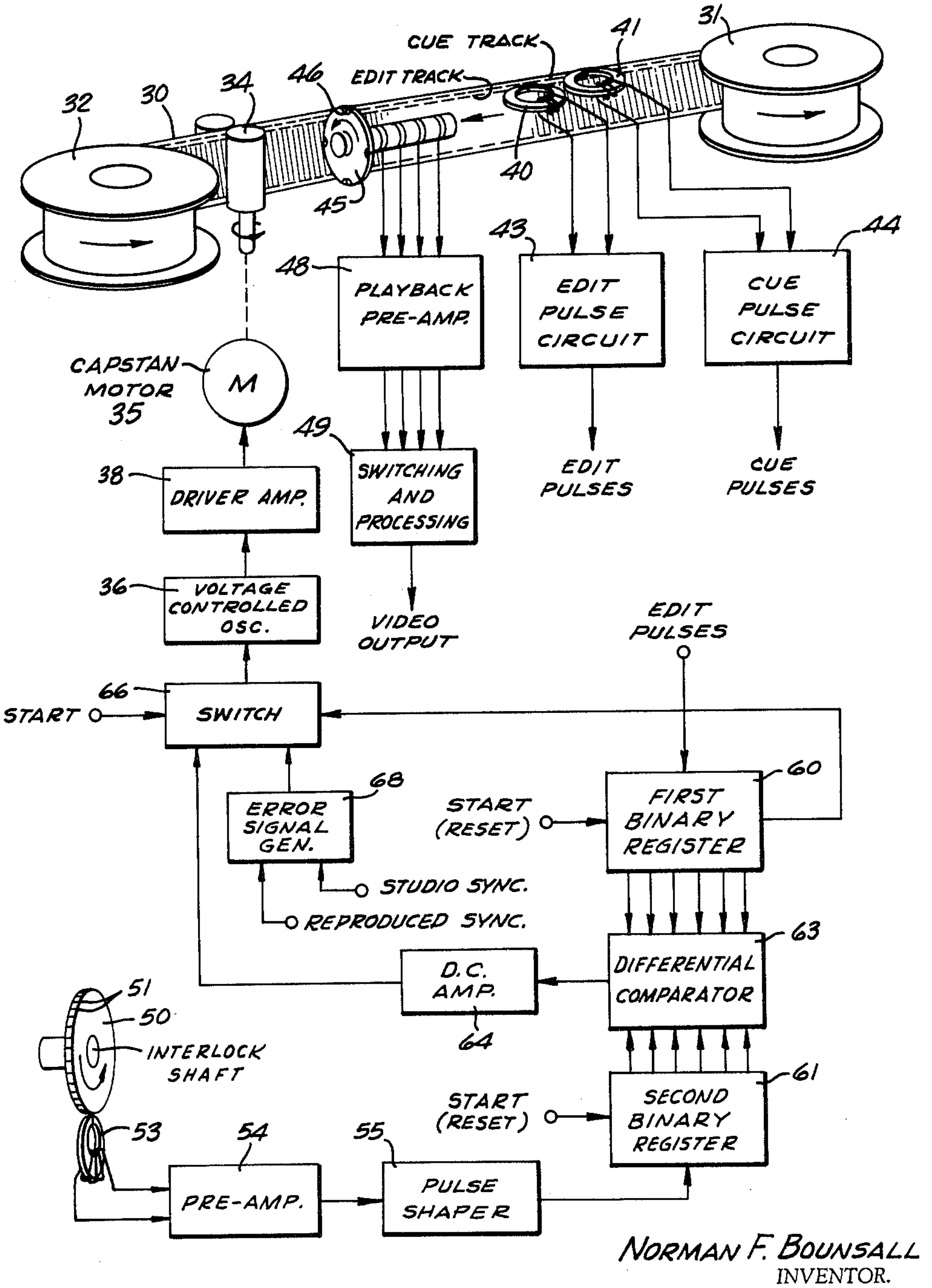
FIGURE 2 is a combined partial perspective and block diagram of an interlock control system in accordance with the invention which employs electronic control means.

A particularly advantageous, all electronic, control system for interlocking a continuously driven transverse track magnetic tape recorder with other recording and reproducing systems is shown in FIGURE 2 in simplified form. By "simplified form" is meant that the various servo systems, processing circuits and other features of such a system have not been shown except as they are related to the elements directly useful to a description of the invention. In this system, a relatively wide magnetic tape 30 is transported between a supply reel 31 and a takeup reel 32. Longitudinal tape speed is determined by a rotating capstan 34 which urges the tape against an opposing pinch roller in conventional fashion. Capstan rotation is provided by a capstan servo motor 35 which is varied in speed by energizing signals of varying frequency from a voltage controlled oscillator 36 coupled through driver amplifier cricuits 38. A variable voltage level at the input terminal of the voltage controlled oscillator 36 correspondingly changes the driving frequency of the motor 35 and speed of the capstan 34, in accordance with the operation of the interlock system or the normal servo system of the tape transport mechanism, as is described in greater detail below.

The tape 30 is shown as including substantially transverse recording tracks for the composite video signal, and longitudinal recording tracks for audio signals, edit pulses and cue pulses. These tracks are shown as visible for clarity and will be understood to be drawn without specific sizes or proportions. The arrangement and use of the longitudinal tracks may vary quite widely. For example, the cue pulses or the edit pulses might be recorded on the audio track as high frequency bursts, or as other uniquely identifiable signals which may be detected by appropriate circuitry. Here an edit pulse head 40 and a cue pulse head 41 provide signals to edit pulse circuits 43 and cue pulse circuits 44 respectively. During recording of the video signals, pulses identifying the separate frames are recorded as the edit pulses. These edit pulses establish a normal pulse repetition rate corresponding to the television frame rate of 30 pulses per second, and also establish start points for individual frames. The cue pulses provide markers for selected transition points in the program material and may be used to denote the interlock start points.

The composite video signal is recorded on and reproduced from the tape by a rotating head drum 45 having a set of four equally spaced peripheral magnetic heads 46 which sweep transversely across the tape 30 at high speed as the tape is moved longitudinally. The operation of the driving and servo control systems for the head drum, and the female guide mechanism (not shown) which cups the tape 30 around the head drum 45 have been amply described in the literature and therefore have been omitted. Reproduced signals from each of the heads 46 as they successively sweep across the tape 30 are coupled through appropriate brush contacts to separate playback preamplifiers 48 and then to switching and processing circuits 49 which recombine the signals from the separate heads into a single continuous signal train. This final output signal is an arcuate, time stable, representation of the originally recorded input signal. It will be evident, however, to those skilled in the art that considerable inertia must be overcome in bringing the tape 30, the supply reel 31 and the takeup reel 32 up to speed, and that there will be slippage of the tape during the acceleration interval.

The edit pulses from the transverse track recording and reproducing system comprise an input signal train to a speed comparator device which also receives the input signals representative of the change in speed of the interlock system. A suitable timing signal generator, corresponding to the generator 20 of FIGURE 1, is provided by a disc 50 which is mounted on and rotatable with the interlock shaft. The disc 50 may have a surface magnetic recording, or as shown, permanently magnetized elements 51 disposed about the periphery thereof. These elements are selected and spaced relative to the normal rate of rotation of the shaft and to each other to result in the generation of pulses at a 30 pulse per second rate by an associated magnetic playback head 53. The pulses generated by the playback head 53 are passed through preamplifier circuits 54 and pulse shaper circuits 55 to provide sharply defined input signals for the speed comparator device.

The term "speed comparator device" may be considered to relate to the instantaneous speeds of the tape 30 and the disc 50. In a broader sense, however, the device may be regarded as a comparator of the time relation of the program material itself, in that its principal purpose is to provide a basis for accelerating the continuously driven record member in a relation to the other record members. First and second binary registers 60, 61 are employed, each consisting of a number of binary stages which may be coupled as a binary counter or shift register. Both the binary registers 60, 61 are reset by the start pulses for the system. The first binary register 60 receives the edit pulses from the tape transport system while the second binary register 61 receives the pulses generated from the timing disc 50. It is here preferred to employ binary counters, because the total desired number of counts can be accommodated with fewer stages, and because the counter, when full, provides a carry pulse to indicate the completion of the desired count. It is preferred that the counter have sufficient stages to accommodate a count of approximately 600, which provides an adequate interval for insuring that normal speed is reached.

The binary output signal patterns represented at the output terminals of the two binary registers 60, 61 are applied to a differential comparator 63 which provides a D.C. output signal representative in amplitude and polarity of the difference between the two register counts. Various other expedients than the differential comparator are known and may be employed for this purpose, including a subtraction circuit coupled to control a digital to analog converter. Output signals from the differential comparator 63 are applied through a D.C. amplifier 64 and control the voltage controlled oscillator 36 through an electronic switch 66. Start pulses set the switch 66 to complete the circuit between the D.C. amplifier 64 and the voltage controlled oscillator 36. When a carry pulse is received from the first binary register 60, to indicate that the register 60 is full, the switch 66 is operated to complete the circuit between the normal error signal generator 68 of the tape transport system and the voltage controlled oscillator 36, thus placing the system under normal servo control.

The system of FIGURE 2 effectively interlocks actual movement of the tape 30 with the actual movement of the interlock shaft from the interlock system 16, as represented by the rotation of the disc 50. With the tape 30 set at a selected start point, and other record members correspondingly positioned, a start pulse resets the binary registers 60, 61 and sets the switch 66 so that the speed comparator device controls the voltage controlled oscillator 36. The start pulse also impulses the interlock system of FIGURE 1, causing the interlock shaft to begin rotating. During acceleration, the edit track of the tape 30 and the track of the timing disc 50 are read, to result in the generation of two pulse trains of gradually increasing frequency. Because frames of program material are identified by successive pulses, the maintenance of count equality insures synchronization of program material. The counts need not, however, be kept together at the outset, because the binary registers 60, 61 maintain a cumulative count and such discrepancies are later corrected. As the input pulses are counted, the differential comparator 63 continually responds to the differences between the counts to generate a corresponding analog signal. This analog signal, after amplification, constitutes the error signal for a separate closed loop servo system which controls the rotation of the capstan 34. If, for example, the interlock shaft tends to accelerate faster than the tape 30, on a comparable basis, that count in the second binary register 61 begins to exceed that in the first binary register 60 by an increasing amount, and the error signal applied to the voltage controlled oscillator 36 increases the frequency of the signal driving the capstan motor 35, and accelerates the tape 30 to compensate. Differences are eliminated by the time normal speed is reached, so that equal numbers of frames are passed on each recording and reproducing system during acceleration to normal speed. Systems of the present invention therefore operate to insure that all program sources, whether continuously driven or not, are properly interlocked.

The arrangement of FIGURE 2 has the additional advantage of permitting rapid and automatic change-over to normal system operation. At the point at which the first binary register 60 is completely filled by input pulses, sufficient time will have elapsed for normal speed operation to be assumed. The carry pulse from the first binary register 60 thus operates the switch 66, returning the voltage controlled oscillator 36 to its normal control by the error signal generator 68 in the system. Although several different types of servo controls for the capstan speed are employed, the error signal generator 68 illustrated herein utilizes a comparison between specific components of the studio synchronizing signal (the stable reference signal used in broadcast and editing studios) and the reproduced synchronizing signal components derived from the tape transport system itself.

The example of the invention provided in FIGURE 3 is an electromechanical system arranged for control of a magnetic tape recorder system such as is shown in FIGURE 2. Similar parts have similar designations to those used in FIGURE 2.

In the system of FIGURE 3, the read head 70 which is disposed adjacent the edit track on the tape 30 is selected to be of the type which provides an output signal even though there is no relative movement of the tape 30 relative to the head 70. That is, the head 70 may be selected from the class consisting of flux responsive heads, scanning heads and Hall effect heads. Read head 70 therefore provides a signal which is continuously representative of the phase relation of the pulse peaks of recorded edit pulses to the stationary head 70 at any instant. The signal also indicates the physical disposition of separate frames on the tape 30 to the read head 70. The signal is passed through preamplifier and pulse shaper circuit 71, 72 respectively to one input of a phase comparator circuit 74. Similarly, phase representative signals are derived from a recording on a magnetic disc 75, by a like stationary read head 76. As in the arrangement of FIGURE 2, the magnetic pattern on the disc 75 provides a 30 pulse per second repetition rate when the disc 75 is rotated at normal speed by one of the interlock motors in the interlock system. Signals from this stationary read head 76 are passed through amplifier and pulse shaper circuits 77 to the remaining input terminal of the phase comparator 74.

In this arrangement, the capstan 34 is alternatively rotated through a drive coupling 80 from either the capstan drive motor for the system or from a shaft 81 coupled to the interlock motor 17. The drive coupling 80 may be a differential mechanism having two drive gears, for example, one coupled to each of the different input sources. The drive gears may be selectively disconnected by associated magnetic clutches 83, 84 respectively, which are controlled so that when one input shaft is rotating the other is concurrently braked. When the magnetic clutch 84 coupled to the capstan drive motor 35 is engaged, normal system operation is effected from a control signal generator 85 which responds to the time relationship of the studio synchronizing pulses and reproduced synchronizing pulses.

When the magnetic clutch 83 in the train to the interlock motor shaft 81 is engaged, however, the speed control system which is governed by the interlock system becomes operative. Regulation of the speed of the interlock motor shaft 81 is carried out by a differential coupling 87 including one input which is controlled by a D.C. motor 88. The D.C. motor 88 is in turn responsive through a D.C. amplifier 89 to the phase comparison output signal derived from the phase comparator 74. Output signals from the D.C. amplifier 89 constitute the error signals for the system, and are also used as the basis for returning the system to normal speed control after the interlock control has brought the tape 30 up to speed. To this end, a sampling circuit 90 is coupled to receive the output signal from the D.C. amplifier 89 and to control the magnetic clutches 83, 84. The sampling circuit may in one example consist of an averaging circuit having a selected time averaging interval, together with means responsive to the averaged signal over the selected interval for inhibiting the generation of a switching signal as long as the phase relationship of the two input signals is not held substantially constant for a selected minimum time.

In the operation of the arrangement of FIGURE 3, the tape 30 and other record members are positioned at the selected interlock start points and held stationary while the interlock shaft is also stationary. The magnetic clutch in the train to the interlock motor shaft 81 is engaged, and the capstan drive motor 35 is disengaged through the operation of the magnetic clutch 84. Thus, as the interlock motor 17 begins rotation, it directly drives the capstan 34. The drive rate, however, is altered by the D.C. motor 88 which controls the variable input to the differential coupling 87. Precise control signals are generated even at low speeds, because of the use of the stationary read heads 70, 76 in conjunction with the tape 30 and the magnetic disc 75. As in the system of FIGURE 2, this system locks the actual acceleration rate of the tape 30 to the actual rotation of the interlock motor drive shaft 81. Because phase control and not frequency control is employed, errors in frame relationships are corrected during the crucial acceleration interval by speeding up or slowing down the capstan 34 so as to maintain the reproduced pulses from the tape 30 in proper phase relationship to the reproduced pulses from the magnetic disc 75.

The phase relationship may vary substantially, but within selected limits within an individual cycle (and frame) as the record members accelerate to normal speed. When normal speed is reached, all the mechanical elements are driven at a substantially constant rate, and the error signal is at a minimum level. When no appreciable error signal appears over the predetermined interval the sampling circuit 90 generates the switching signal for the magnetic clutches 83, 84. On the switching signal, the magnetic clutch 84 couples the capstan drive motor 35 directly to the capstan 34 through the coupling 80, while the interlock motor shaft 81 is concurrently disengaged by operation of the magnetic clutch 83. Thereafter, system operation proceeds in conventional fashion.

In both instances, the method employed in accordance with the present invention is the same, and substantially as set forth in FIGURE 4. As the initial recording is made, the start point is marked by any convenient means, such as the clapper board which provides both audio and visual indications for motion picture film and sound on film or sound on tape. It may be desired to dub in special sound or voice effects, create special effects of other kinds or synchronize this initial recording with one or more other recordings for any of a variety of purposes. It is seldom convenient to utilize a direct dubbing onto the previously recorded track, both because it is difficult to achieve proper signal balance and because an imperfect second recording may require that the entire process be started over again. Accordingly, the next step of the method involves the repetition of the original recording while the added recordings are made concurrently. For special sound effects, for example, a film may be displayed on a screen while sound generating equipment is used. For television program material, live recordings may be made in controlled time relation to a film which is being shown, so that they may be later combined in proper time relation to the filmed material. The start point for the initially recorded material is also marked on the new recordings, in some fashion which can be later identified.

For the actual operation of the interlock system, all recordings are then positioned at their start points with the various driving systems remaining stationary. For sound on film, for example, the unique identified mark which defines the start point would be placed adjacent the recording point of the mechanism while for the transverse track magnetic tape recorder, the same mark might be identified on the audio recording track by visual means as a unique sharply defined variation in the track. All systems are then interlocked and the interlock mechanism is started with continual control of actual tape movement being maintained as the systems are brought up to speed. Finally, when normal speed is obtained and systems are in interlocked relationship, the interlock system is released and the normal drive system for the continuous recording and reproducing system is allowed to maintain control thereafter.

What is claimed is:

1. A system for bringing a continuously driven recording and reproducing system up to speed from a standing start while maintaining recorded material of a record member in interlocked relationship to recorded material on a record member in a second recording and reproducing system, the system comprising:

means responsive to the operation of the first continuously driven recording and reproducing system for producing first timing signals, the number of which is representative of the extent of movement of the record member of the first system, the first timing signals having a selected repetition rate at normal speed operation of the first system;

means responsive to the movement of the record member of the second recording and reproducing system for providing second timing signals, the number of which is representative of the extent of movement of the record member, the second timing signals having the selected repetition rate at normal speed operation of the second system; and means responsive to the differences between the numbers of first and second timing signals for adjusting the rate of operation of the first recording and reproducing system to establish equivalent amounts of movement of the record members.

2. A system for bringing a continuously driven recording and reproducing system up to speed in interlocked relation relative to other recording and reproducing systems, each of the recording and reproducing systems having a record member, the system comprising:

means responsive to the operation of the first continuously driven recording and reproducing system for providing first timing signals, the number of which is representative of the extent of movement of the first system;

means responsive to the movement of the remaining systems for providing second timing signals, the number of which is representative of the extent of movement of the remaining systems; and, means responsive to differences between the numbers of first and second timing signals for adjusting the rate of movement of the first recording and reproducing system.

3. A system for providing interlock operation of a continuous drive system subject to slippage in moving a record member with a positive drive system for other record members comprising:

means for indicating the extent of movement of the positive drive system;

means responsive to the extent of movement of the record member for comparing the extent of movement of the record member to the movement of the positive drive system; and means responsive to the means for comparing and controlling the continuous drive system to maintain the movement of the record member in a selected relation to the movement of the positive drive system.

4. A system for bringing a magnetic tape system having a variable normal speed capstan drive up to speed from a standing start in interlocked relation to other systems, the magnetic tape being subject to slippage relative to the capstan drive, the system comprising:

means in operative association with the magnetic tape for providing first timing signals representative of the extent of movement of successive segments of program material recorded on the tape;

drive means for accelerating the capstan drive of the speed in accordance with the movement of the other systems;

timing signal generator means coupled to the drive means and providing second timing signals representative of the extent of movement of corresponding successive segments of program material as would be provided by the drive means without slippage;

comparator means responsive to the relationship in time between the first and second timing signals which are provided;

means responsive to the comparator means for varying the speed of the variable speed capstan drive relative to the speed of the drive means during acceleration of the magnetic tape;

normal control means for driving the variable speed capstan drive at a fixed normal speed after the magnetic tape system has been brought up to normal speed; and, means for returning the variable speed capstan drive to normal control when normal speed operation has been obtained.

5. A system for bringing a capstan driven television tape recorder up to normal speed in proper synchronized relation with associated tape recorders despite capstan slippage, including:

a television tape recorder having controllable capstan means, the tape recorder including a control track having control pulses recorded thereon which are spaced to represent the frame spacing of the recorded material;

reproducing means associated with the tape recorder for reproducing the control pulses;

positive drive means for providing acceleration control of associated tape recorders;

a drive member for accelerating said capstan means and coupled to be driven at a speed corresponding to the speed of the positive drive means;

pulse generator means coupled to the drive member for providing speed pulses at the frame repetition rate of the recorded material in the associated tape recorders;

comparator means responsive to the time of occurrence of the control pulses and the speed pulses;

control means coupled to the comparator means and responsive to time differences between the control pulses and the speed pulses, the control means being coupled to vary the speed of the capstan means of the tape recorder from the speed of the drive member during startup intervals; and means coupled to disconnect the control means and the drive member after normal speed operation of the tape recorder has been obtained and including normal speed driving means to be connected to said capstan means for normal speed operation.

6. A system for maintaining an interlocked relationship during change of speed operations between a first recording and reproducing system having a signal controlled drive means, and a reference drive member, the system comprising:

means responsive to the extent of movement of the driven member of the first system for providing first timing signals;

means responsive to the extent of movement of the reference drive member for providing second timing signals;

first and second counting means for counting the first and second timing signals respectively;

an error signal generator responsive to the difference in the count of the first and second counting means respectively; and means responsive to the error signal generator for controlling the speed of the signal controlled drive means of the first recording and reproducing system.

7. A system for maintaining the magnetic tape of a capstan-driven magnetic tape recording and reproducing system in interlocked relation to positively driven record members, an associated recording and reproducing system during acceleration to normal speed operations comprising:

means associated with the magnetic tape for providing edit pulses at a first repetition rate corresponding to the speed of operation of the magnetic tape system;

timing pulse generator means responsive to the movement of the positively driven record members for providing timing pulses at a second repetition rate corresponding to the speed of operation of the associated systems, the first and second repetition rates being equal during normal speed operation;

first counter means responsive to the edit pulses;

second counter means responsive to the timing pulses;

differential comparator means coupled to the first and second counter means and responsive to the difference between the counts therein for providing an error signal whose amplitude and polarity indicates the difference; and means responsive to the error signal for controlling the speed of the tape drive means of the capstan driven magnetic tape system during acceleration.

8. A system for bringing a television tape recorder up to speed from a standing start while maintaining program material recorded on the magnetic tape in interlocked relation to program material recorded on the other positively driven record members, comprising:

a capstan means for driving the magnetic tape;

variable speed drive coupled to the capstan and responsive to the frequency of alternating current signals;

voltage controlled oscillator means responsive to an input signal and providing a variable frequency alternating current signal to the variable drive means;

means including a longitudinal track disposed on the magnetic tape for providing edit pulses corresponding to the frame repetition rate of recorded television material;

timing pulse generator means coupled to be driven at a speed corresponding to the speed of the other positively driven record members and providing timing pulses at the frame repetition rate of the television material recorded thereon;

first binary register means responsive to the edit pulses;

second binary register means responsive to the timing pulses;

differential comparator means coupled to the first and second binary register, the differential comparator means providing an error signal representing in amplitude and polarity a difference between the contents of the first and second registers;

capstan control means for providing signals to operate the capstan means through the voltage controlled oscillator means in normal system operation; and switch means selectively coupling error signals and signals from the capstan control means to the voltage controlled oscillator means, the switch means being responsive to signals indicating the completion of entries in at least one of the binary registers for disconnecting the differential comparator from the voltage controlled oscillator and for providing normal control of the capstan from the capstan control means at a fixed normal speed.

9. A system for accelerating a continuously driven first record member from a standing start to normal speed in interlocked relation to positively driven record members controlled by a drive member, including the combination of:

means associated with the first record member for providing time varying signals corresponding to the speed of the first record member and having a selected frequency at the normal speed of the first record member including means providing first phase representative signals;

means coupled to the drive member for providing time varying signals corresponding to the speed of the positively driven members and having the selected frequency at the normal speed of the positively driven record members, including means providing second phase representative signals;

phase comparison means responsive to the first and second phase representative signals;

capstan means for continuously driving the first record members;

differential coupling means having the drive member coupled to one input to drive the capstan means; and motor means responsive to the phase comparison means and coupled to the other input of the differential coupling means for varying the speed of the capstan means.

10. A system for driving a magnetic tape during change of speed intervals while maintaining a fixed relation between the extent of movement of the magnetic tape and the movement of a drive member, the system comprising:

means associated with the magnetic tape for providing a recorded repetitive signal pattern thereon;

first stationary scanning means responsive to the stored pattern on the magnetic tape for deriving a first phase representative timing signal;

timing means coupled to be driven by the drive member, the timing means including a repetitive stored signal pattern thereon;

second stationary scanning means responsive to the stored pattern on the timing means for providing second phase representative timing signals therefrom;

means coupling the drive member to control the longitudinal movement of the magnetic tape; and means responsive to the phase relationship of the first and second timing signals for varying the amount of movement of the tape in response to a given movement of the drive member.

11. The invention as set forth in claim 10, wherein the system additionally includes capstan means for driving the tape:

a normal drive system for the capstan means;

clutch means selectively coupling the drive member and the normal capstan drive means to the capstan means; and means responsive to normal speed operation of the capstan means for selectively engaging the normal capstan drive means and disengaging the drive member.

12. The method of interlocking a television tape recorder with another recorder system having a drive member which includes the steps of indicating the extent of movement of the tape:

indicating the extent of movement of the drive member;

comparing the extent of movement of the tape and the drive member; and adjusting the rate of movement of the tape in accordance with the results of the comparison.

13. The method of providing double system operation of a television tape recorder and another system controlling a number of other reproducing systems which includes the steps of running the tape recorder concurrently with the other reproducing systems to provide a common start point during concurrent operation:

positioning the recorder and each of the other reproducing systems at their respective start points;

starting the recorder and the other system;

generating first signals representative of the actual rate of movement of the tape;

generating second signals representative of the actual movement of the other reproducing systems;

comparing the first and second signals; and adjusting the advance of the tape in accordance with the results of the comparison.

References Cited by the Examiner

UNITED STATES PATENTS 3,064,173 11/1962 Breen .............. 318—312

OTHER REFERENCES

Journal of the Society of Motion Picture and Television Engineers, vol. 66, No. 4, April 1957, pp. 189–192.

DAVID G. REDINBAUGH, *Primary Examiner.*

H. W. BRITTON, *Assistant Examiner.*